G. HAVELL,
Assignor to ROBERTS & HAVELL.
Traveling-Bag Frames.
No. 8,530. Reissued Jan. 7, 1879.
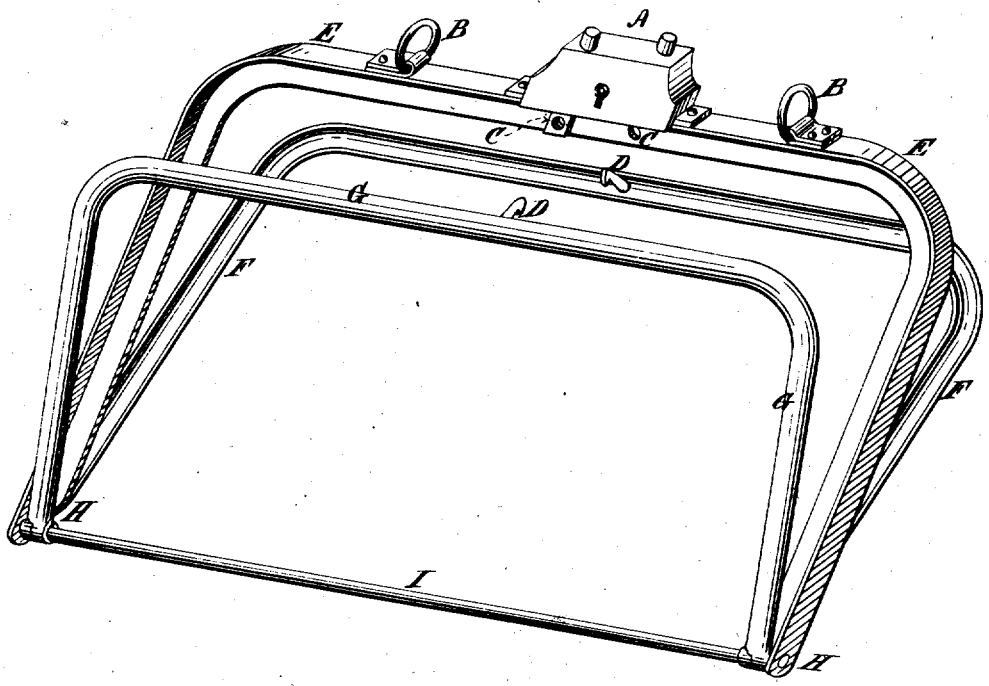
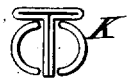
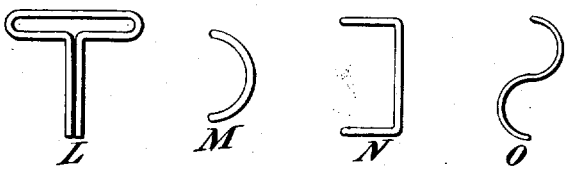
Witnesses:
Geo. W. Miatt
Edw^d Payson
Inventor:
George Havell,
By Edw. E. Quimby,
Atty.

UNITED STATES PATENT OFFICE.

GEORGE HAVELL, OF NEWARK, NEW JERSEY, ASSIGNOR TO ROBERTS & HAVELL, OF SAME PLACE.

IMPROVEMENT IN TRAVELING-BAG FRAMES.

Specification forming part of Letters Patent No. 55,290, dated June 5, 1866; Reissue No. 8,530, dated January 7, 1879; application filed November 14, 1878.

*To all whom it may concern:*

Be it known that I, GEORGE HAVELL, of the city of Newark, in the county of Essex and State of New Jersey, have invented certain new and useful Improvements in Frames for Traveling-Bags and other purposes, of the construction and operation of which the following specification, taken in connection with the accompanying drawings, is a full, fair, clear, and exact description.

By reference to the accompanying drawings it will be seen that this invention does not relate to the construction of the entire bag, as to its form, or the material of which it is made, but only to that part of its structure commonly called the "frame," intended to close and secure the mouth, and, when open, to give access to the cavity or cavities of the bag. To this frame the carpet, canvas, leather, or other material of which the bag may be made, is attached. I therefore, to designate more particularly the nature of the invention, call it an improvement in the frames for traveling-bags and other structures of a like character, and not broadly an improvement in carpet-bags. Iron, steel, brass, or any other suitable material may be used in the construction of these frames.

In the drawings hereto attached, A represents a lock, of a peculiar construction, placed or secured upon the central bar of the frame; but as it forms no part of this invention it is only introduced to show how the two side pieces, F and G, are fastened to it by means of the two hasps D D by passing through the holes C C of the middle piece, E. B B are rings fastened to this piece, for attaching a chain or strap thereto. Therefore this frame consists, essentially, of the two outside pieces, F and G, and the central piece, to which the lock A is attached, these three being pivoted together at their ends, as shown at H H, by a cross-bar, I.

Although these pieces are shown to be bent between their ends into a semi-quadrangular form, I do not confine myself to that particular shape, as they may be made of a semicircular, semi-elliptical, or any other desired figure. It is important, however, that they should all have the same form of curve, so that when the bag is completed the side pieces, F and G, shall fit up closely to the central piece, E, under the protection of its flanges.

The figure L represents a cross-section of the central piece, from which it is seen that it is made of a continuous sheet of metal, folded and bent so as to assume the form of the letter T very nearly. The letter M represents a cross-section of the two outside frames, F and G; but I sometimes make these of the forms represented in section by the letters N and O. The letter K represents a cross-section of the three pieces E F G when brought together to close the mouth of the bag, the side pieces, F and G, having the form of M.

The side pieces may be made to show, in cross-section, a triangular, corrugated, or other form that combines lightness with strength; for when made of any of these forms they will resist bending or breaking much more than a flat or round strip of metal of the same weight, and thus give a surer protection to the contents of the bag against loss by accident or otherwise.

I prefer making the central piece, E, of sheet metal, bent in the form represented in cross-section, as shown in Fig. L, not only because it combines strength and lightness in an eminent degree, but because the interstice between the lips forming the shaft or lower limb facilitates the attachment thereto of the division-cloth commonly used in such bags, thus so completely separating the two cavities produced thereby that either one may be opened and used without exposing or disturbing the contents of the other. This central piece, E, might be made solid by rolling or casting the metal used; but then this division-cloth or diaphragm, if required, could not be so easily or securely attached to it as when constructed in the form proposed. However, in whatever manner the central piece, E, may be made, it is evident its general form gives it great additional strength over a mere flat sheet, while its projecting flanges protect the side pieces, to great extent, from being injured accidentally or intentionally when locked or otherwise closed together, and also act as shields, which prevent the escape of thin objects from the bag, thus performing important and much-desired functions in this class of devices.

It is proper to say that, although the hasps or bolts for fastening the frame together are shown (owing to the introduction of the peculiar form of lock) in the drawings as attached to the side pieces, F and G, they may as well be attached to the central piece, E, and pass through the former, particularly when small padlocks are used for completing the fastening up of the bag.

I claim as my invention—

1. In a bag-frame, a strip of sheet metal longitudinally so bent or folded as to present a groove or recess between its parallel folds for receiving the edge of one of the pieces of cloth or other material of which the bag is made, substantially as set forth.

2. In combination with the side pieces of a bag-frame, an intermediate shield-piece, secured to the frame, and adapted to cover the joint made by the side pieces of the frame when closed, for the purpose of protecting the side pieces and preventing the escape of thin objects from the bag, substantially as described.

3. A bag-frame composed of the side pieces, F and G, and a central piece, E, which is T-shaped in cross-section, substantially as shown and described.

GEORGE HAVELL.

Witnesses:

H. A. KINGSLEY,

JOHN OTTO.